United States Patent [19]

Havdal

[11] Patent Number: 5,479,779
[45] Date of Patent: Jan. 2, 1996

[54] DEVICE FOR THE PREVENTION OF THE ABUSE OF DRY-PLATE CLUTCHES

[75] Inventor: Hans P. Havdal, Kongsberg, Norway

[73] Assignee: Kongsberg Automotive A/S, Norway

[21] Appl. No.: 244,723

[22] PCT Filed: Dec. 18, 1992

[86] PCT No.: PCT/NO92/00202

§ 371 Date: Sep. 12, 1994

§ 102(e) Date: Sep. 12, 1994

[87] PCT Pub. No.: WO93/13328

PCT Pub. Date: Jul. 8, 1993

[30] Foreign Application Priority Data

Dec. 20, 1991 [NO] Norway ..................... 915047

[51] Int. Cl.⁶ ..................... F15B 7/00; F15B 7/10
[52] U.S. Cl. ..................... 60/591; 60/592; 251/77
[58] Field of Search ..................... 60/533, 591, 592; 251/77, 117

[56] References Cited

U.S. PATENT DOCUMENTS

| | | |
|---|---|---|
| 3,733,823 | 5/1973 | Muterel . |
| 4,294,070 | 10/1981 | Farr ..................... 60/591 X |
| 4,464,900 | 8/1984 | Bainbridge . |
| 4,566,277 | 1/1986 | Birkenbach ..................... 60/591 X |
| 4,789,131 | 12/1988 | Vork ..................... 251/77 X |
| 5,020,326 | 6/1991 | Barker et al. ..................... 60/592 X |
| 5,144,878 | 9/1992 | Cadeddu ..................... 60/591 X |

FOREIGN PATENT DOCUMENTS

| | | |
|---|---|---|
| 0158004A1 | 10/1985 | European Pat. Off. . |
| 2946297 | 6/1987 | Finland . |
| 1143365 | 2/1963 | Germany . |
| 1600184 | 9/1975 | Germany . |
| 3031262 | 1/1983 | Germany . |
| 3736584A1 | 5/1989 | Germany . |
| 910938 | 3/1991 | Norway . |
| 753516 | 7/1956 | United Kingdom . |
| 72931 | 4/1987 | United Kingdom . |

*Primary Examiner*—Edward K. Look
*Assistant Examiner*—Hoang Nguyen
*Attorney, Agent, or Firm*—Finnegan, Henderson, Farabow, Garrett & Dunner

[57] ABSTRACT

A device for the prevention of the abuse of a dry-plate clutch (1) for a motor vehicle with a manual gearbox, wherein the device acts jointly with a hydraulic master cylinder (3) and a related slave cylinder (4) in the operation of the clutch (1). The device comprises a valve unit (20) which is installed hydraulically in series with and between the master cylinder (3) and the slave cylinder (4). The valve unit opens when the valve body (32) is moved towards the slave cylinder (4). A first passage (53) which extends in the valve body (32) or in the valve housing (21) permits restricted fluid flow through the valve (20) when the valve unit (20) is closed. A device (33,35,41) keeps the valve unit (20) open when the clutch is located in positions between a position of maximum disengagement and a second position located close to the position in which the clutch begins to engage. During an engagement of the clutch which is so rapid that there is a risk of damage to the transmission, the force of a spring (40) which attempts to open the valve unit (20) becomes less than the force exercised by the hydraulic fluid on the valve body (32) and attempts to close the valve unit (20), thus causing it to be moved towards its seat (31), whereupon the fluid is forced to flow through the passage (53).

7 Claims, 1 Drawing Sheet

5,479,779

DEVICE FOR THE PREVENTION OF THE ABUSE OF DRY-PLATE CLUTCHES

BACKGROUND OF THE INVENTION

The invention concerns a device for the prevention of the abuse of a dry-plate clutch for a motor vehicle with a manual gearbox, wherein the device acts jointly with a hydraulic master cylinder and a related slave cylinder in the operation of the clutch.

The use of a device of the above-mentioned type prevents the transfer of an excessive torque gradient (torque change per time unit) to the transmission due to a too rapid release of the clutch pedal during the engagement of the clutch. Such abuse of the clutch is especially risky when starting in, first gear or in reverse gear, as well as when moving through the lowest gears when driving forwards. The sudden forces acting on the transmission during such a rapid engaging of the clutch often result in damage to the differential gears, the crown wheel and the pinion of the rear axle transmission unit, the drive shaft and the gearbox, but damage has also been found in engines due to frequent abuse of the clutch. There are previously known devices for counteracting the abuse of the clutch, where the devices are not included in the hydraulic clutch system, but comprise levers and rods which are connected to the clutch pedal or the clutch master cylinder's piston rod or the clutch disengagement arm, and are effective shock absorber. These mechanical systems must be manufactured with fine tolerances, are difficult to instal, expensive and dampen the clutch movement every time it is engaged, even when the clutch pedal is released in the correct manner.

Another known system for counteracting the abuse of the clutch works hydraulically via a choke device with a non-return valve installed in a bypass pipe. When the clutch is engaged the non-return valve closes, thus causing all the hydraulic fluid to flow via the choke device, thereby providing a damping during the entire return movement of the clutch pedal. In this case too a damping takes place each time the clutch is engaged, irrespective of whether the clutch pedal is moved rapidly or slowly. Since the damping takes place during the entire return movement, a rapid gear change is virtually impossible, a fact which is particularly critical and awkward when changing gear at low temperatures since the damping increases and the clutch can slip.

For this reason, in another embodiment of this system an electromagnetically controlled valve is incorporated which engages the device only when the clutch is used in connection with first gear and reverse gear. Thus there is no protection against abuse of the clutch in the other gears.

From DE1600184, DE3031262 and FI842051 there are known devices of the above-mentioned type where a valve ensures that a pressure-based clutch can be engaged rapidly until a predetermined pressure has built up in the hydraulic fluid, whereupon a delay occurs. Apart from this no consideration is given to whether the clutch is operated rapidly or slowly. Thus this solution is not suitable for spring-based dry-plate clutches.

The object of the invention is to provide a device of the type described in the introduction which is not encumbered by the above-mentioned disadvantages.

SUMMARY OF THE INVENTION

To achieve this object, the invention provides in a device for the prevention of the abuse of a dry-plate clutch for a motor vehicle with a manual gearbox due to too rapid an engagement of the clutch, wherein the device acts jointly with a hydraulic master cylinder and a related slave cylinder for operation of the clutch, and the device includes a valve unit that is installed hydraulically in series with and between the master cylinder and the slave cylinder, the valve unit having a valve body and a valve housing having a valve seat for the valve body and a first and a second valve housing chamber located on each side of the valve seat and arranged to face the slave cylinder and the master cylinder respectively, the valve unit opening when there is movement of the valve body from the valve seat and into the first valve housing chamber of the valve unit, the improvement comprising a first passage directly connecting the first and second valve chambers of the valve unit with each other to permit restricted fluid flow between the chambers when the valve body sits on the valve seat and the valve unit is closed, means for forcibly opening the valve unit when the clutch is located in a position between a position of maximum disengagement and a second position located close to the position in which the clutch begins to engage, and a spring arranged to exercise a force on the valve body to bias the valve body away from the valve seat, wherein the force exercised by the spring is greater than the force exercised on the valve body by the hydraulic fluid when the fluid flows towards the master cylinder during a predetermined normal rate of engagement of the clutch, but wherein the force exercised by the spring is less than the force exercised on the valve body by the hydraulic fluid when the clutch is engaged more rapidly than at said predetermined rate.

The characteristic features of the device according to the invention will now be described in more detail with reference to the drawings which illustrates schematically an embodiment of a device according to the invention.

DETAILED DESCRIPTION OF THE INVENTION

In the following description the indications of direction should be understood with reference to the figures unless otherwise specified.

Figure 1:
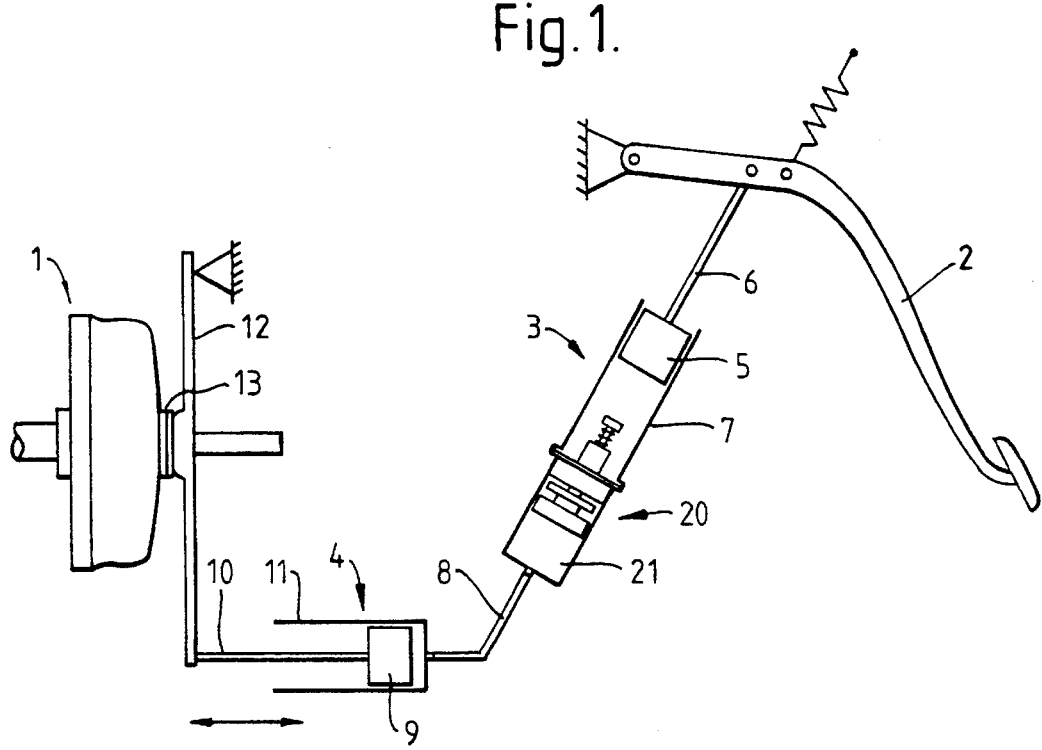
FIG. 1 is a sketch of a hydraulic system for operating a clutch of a motor vehicle, wherein some of the components are shown in section, a clutch pedal is located in its rest position and a clutch of the dry-plate type is engaged.
Figure 2:
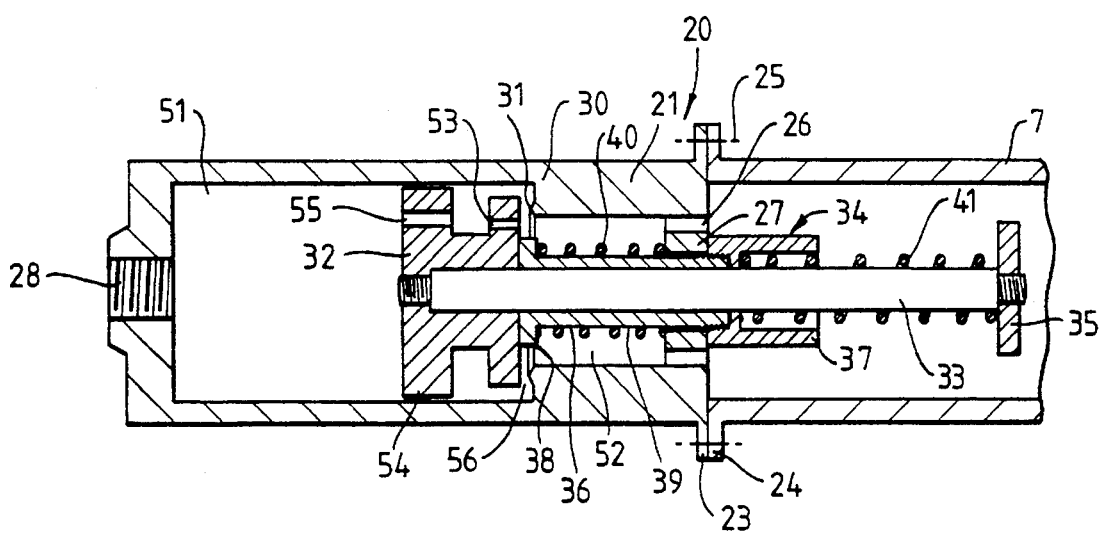
FIG. 2 is a longitudinal section through the device where it is located in its rest position.

As illustrated in FIG. 1 a system for operating a clutch 1 comprises a clutch pedal 2 which the driver of the vehicle can move with his foot, a hydraulic master cylinder 3 and a slave cylinder 4. The clutch pedal 2 is linked to the piston 5 of the master cylinder 3 via a piston rod 6 which projects from one end of the master cylinder's cylinder part 7. The master cylinder 3 communicates with the slave cylinder 4 by means of a conduit 8.

The slave cylinder's piston 9 is linked via a piston rod 10 which projects from one end of the slave cylinder's cylinder part 11 to a rotatably mounted lever 12, whereby the clutch's thrust bearing 13 and spring means 15 can be moved. Thus by depressing the pedal 2 the clutch plates can be moved in the known manner towards the right in FIG. 1 to disengage the clutch and vice versa.

At the end of the master cylinder 3 which is provided hydraulically closest to the slave cylinder 4 there is installed a valve unit 20 which constitutes an abuse device for the clutch 1, i.e. a device for counteracting the abuse of the clutch. This valve unit 20 comprises a preferably cylindrical Valve housing 21 one end of which is connected to the master cylinder's cylinder part 7 via e.g. flange sections 23, 24 of the valve unit 20 or the master cylinder 3, the flange sections being capable of being connected to each other by means of screws 25 or the like, as indicated by chain-dotted lines. The valve unit 20 and the master cylinder 3 are preferably coaxial.

The master cylinder 3 and the valve unit 20 communicate with each other via through-going passages 26 which are provided in a transverse end wall 27 at the right hand end of the valve housing 21. The conduit 8 whereby the slave cylinder 4 and the valve unit 20 communicate with each other is screwed into a threaded bore 28 at the other end of the valve housing 21.

In a radially extending circular shoulder section 30 which faces the bore 28, and which projects into the valve housing, there is provided a seat 31 for a valve body 32, which is supported by an axially and centrally extending valve rod 33. This is slidably passed into a sleeve 34 which in turn is slidably passed into a central bore in the end wall 27. The valve rod 33 projects into the master cylinder and is closed with an end plate 35, a threaded end section of the valve rod 33 being screwed into a threaded hole in the end plate.

The sleeve 34 comprises a first and a second sleeve section 36 and 37 which extend coaxially to each other and are permanently connected to each other by means of a threaded joint in order to permit the installation of the sleeve. The first sleeve section 36 has an end flange 38 and a stem section 39. The outer diameter of the end flange 38 and the second sleeve section 37 are larger than the diameter of the bore in the end wall 27, and the outer diameter of the stem section 39 is adapted to the diameter of the bore in the end wall 27, thus enabling the stem section 39 to be moved slidably to the right and the left in this bore, the sleeve's movement to the left thus being restricted by the second sleeve section 37 abutting against the right side of the end wall 27. The sleeve's inner diameter is adapted to the diameter of the valve rod 33, thus enabling it to be moved to the right and the left in relation to the sleeve 34, since such movement of the valve rod 33 can be restricted by the valve body 32 abutting against the end flange 38 of the first sleeve section 36 or by the end plate 35 abutting against the right end surface of the second sleeve section 37.

A first helical spring 40 which is provided around the sleeve's 34 stem section 39 and between the end flange 38 and the end wall 27 attempts to move the sleeve to the left in relation to the valve housing 21. A second helical spring 41 which is provided around the valve rod 33 and extends between the end plate 35 and the second sleeve section 37 attempts to move the valve body 32 and the valve rod 33 to the right in relation to the sleeve 34.

When the valve body 32 abuts against its seat 31, it divides the valve housing 21 into a first valve housing chamber 51 which faces the slave cylinder, and a second valve housing chamber 52 which faces the master cylinder. By means of at least one axially extending passage 53 through the valve body 32 communication is provided between these valve housing chambers 51, 52 even when the valve housing 32 abuts against its seat. Furthermore the valve body has a cylindrical piston section 54 whose outer diameter is only slightly smaller than the inner diameter of the first valve housing chamber 51. In the piston section 54 there is provided at least one axially extending, through-going, second passage 55. When the valve body is only affected by the springs 40, 41, an opening 56 is formed between the valve body 32 and the valve seat 31.

Furthermore the diameter of the valve body 32 is so much smaller than the inner diameter of the valve housing chamber 51 that the radially extending opening between these components does not cause any significant flow resistance for the fluid. When the valve body does not abut against its seat, fluid will thus preferably flow through this radial opening rather than flowing through the first passage 53.

The method of operation of the device is as follows.

In order to disengage the clutch 1 the clutch pedal 2 is first depressed, and the master cylinder's piston 5 is thereby moved to the left in the cylinder part 7. Hydraulic fluid is then forced through the passages 26 in the end wall 27 and on through the opening 56 and the passage 55 in the valve body. From there the fluid flows on to the slave cylinder. Since these passages 26, 55 and the opening 56 are large, there is little flow resistance.

After some movement of the piston 5, means are provided for forcibly opening the valve unit. As embodied, this means comprises valve rod 33 and its end plate 35, piston 5 abutting against the end plate 35, whereupon the piston also moves the valve body 32 to the left via the valve rod 33. If the diameter of the first valve chamber 51 which constitutes a cylinder for the piston section 54 corresponds to the inner diameter of the master cylinder's cylinder part 7, no fluid will flow through the passage 55, since the amount of fluid flowing out of the first valve housing chamber 51 corresponds to the amount of fluid being forced into it from the master cylinder via the passage 26. The clutch will preferably be disengaged and brought into its maximum disengaged position without the end plate 35 having abutted against the right hand end of the second sleeve section 37.

If the clutch subsequently has to be engaged, the clutch pedal 2 is first released, thereby moving the master cylinder's piston 5 to the right. Oil flows thereby from the slave cylinder 4 and into the master cylinder 3 via the valve unit 20. By means of the second spring 41 the end plate 35 will thereby be pressed against the master cylinder's piston 5 and force the valve body 32 to follow its movement. Since for the above-mentioned reason oil too preferably does not flow through the passage 55 in the valve body piston section 54 during this movement, the valve body 32 will not offer any significant resistance to the fluid flow.

When the valve body 32 abuts against the end flange 38 of the first sleeve section 36, the end plate 35 is prevented from following the further movement of the piston 5 to the right. During this first phase of engagement the clutch has been moved from a position of maximum disengagement to a position close to that in which the clutch plates begin to engage.

During the subsequent, second phase of engagement and continued movement of the piston 5 to the right, an amount of fluid corresponding to that which is displaced by the slave cylinder's piston 9 will be forced through the second passage 55 because the valve body 32 is now at rest. If the clutch is then correctly engaged, i.e. at the correct speed, the differential pressure which is created over the piston section 54 due to the fluid's being choked in this second passage 55 and in the opening 56, will not be sufficiently great to create a force which is exercised on the valve body 32, and which is greater than the force which is exercised by the first spring 40. The valve body therefore remains at rest.

The second phase is concluded immediately after the clutch plates are engaged with full force.

During a third final phase the clutch pedal is thereafter moved all the way back, during which the piston 5 of the master cylinder 3 is moved to the position it had before the disengagement of the clutch started. Even if the clutch pedal is moved somewhat more rapidly during this final third phase than during the second phase, the valve body will still not abut against its seat, thus making normal, correct engagement of the clutch possible.

However, if the clutch pedal should be moved so rapidly during the second phase that a corresponding rapid engagement of the clutch could cause damage to the transmission, the differential pressure which is created over the valve body 32 due to the increased fluid flow through the second passage 55 and the opening 56, will cause the force which is exercised on the valve body 32 to the right to become greater than the force which is exercised on it by the first spring 40 in the opposite direction, thus causing the valve body 32 to be moved to the right and to abut against the valve seat 31. In this case the fluid has to pass through the first passage 53. The fluid flow is thereby considerably more choked, which leads to a reduction in the speed of the piston 9 of the slave cylinder 4 and thereby a restriction of the increase per time unit for the torque which is transferred by the clutch. By means of an optimum restriction of this kind, damage due to abuse of the clutch can be avoided, thus increasing reliability of operation. Furthermore the transmission can be dimensioned correspondingly, i.e. it can be designed to be smaller, lighter and thus substantially cheaper to produce.

With the invention the object is achieved of dividing the engagement process into a first rapid phase and a second, slow phase, and of effecting a damping in the case of too rapid engagement. This means that the clutch pedal can be moved rapidly during the first phase which constitutes approximately 50% of the total distance it can cover. Only immediately before the clutch's engagement point and if the engagement speed exceeds a critical value, does a damping of the engagement speed occur, i.e. in the case of abuse of the clutch and only during the actual engagement.

If the diameter of the piston section 54 and thus the inner diameter of the first valve chamber 51 is significantly smaller than the piston 5 of the master cylinder 3, the rate of fluid flow to the right during the first phase of the engagement of the clutch will be greater in the first valve chamber 51 than in the master cylinder 3. The fluid will then attempt to move the valve body to the right but is prevented from doing so by the end plate 35 which abuts against the piston 5. Some of the fluid which is displaced by the slave cylinder therefore has to flow through the passage 55, but can be so extensively choked that the movement of the piston 5 becomes slow. If the fluid is cold this effect is reinforced because the choking is added to the flow resistance in the conduit 8.

Instead of the valve body being adapted to cooperation with the piston 5 of the master cylinder, in a second embodiment of the device according to the invention, the valve body can be adapted to cooperation with the slave cylinder's piston. Movement of this piston too is slow if the diameter of the piston section 54 is significantly smaller than the diameter of the piston.

In these cases the driver will notice that the clutch pedal becomes unpleasantly sluggish and does not follow the foot movement. It is therefore advantageous for the diameter of the valve body's valve 54 to be equal to or only slightly smaller than the diameter of the piston 5 or 9 with which the valve body is connected.

If the speed of the master cylinder's piston 5 is required to be greater during the third phase than during the second phase, the characteristics of the first spring 40 can, for example, be adapted to the characteristics of the spring device which is included in the clutch 1 and which attempts to engage it in such a way that the valve body 32 is moved away from its seat 31 by the spring 40 after the clutch 1 has been engaged. If the force exercised by the clutch's spring in relation to the force exercised by the first spring is thereby reduced during the third phase in relation to the second phase, the differential pressure exercised on the closed valve body would be able to be so small that the valve unit opens once again and the first passage no longer chokes the oil flow.

It should be noted that even though it was stated in the described embodiment of the device that the passage 53 extends through the valve body, it should be understood that the same effect can be obtained if a corresponding passage is provided in the seat section area of the valve housing, provided that it ensures communication between the valve housing chambers 51 and 52 even after the valve body abuts against the valve seat.

It should further be noted that even though the movement of the valve body 32 and the valve rod 33 in relation to the sleeve 34 can instead be restricted by the end plate's 35 abutment against the second sleeve section 37, which in turn restricts the clutch pedal's and the clutch's movement, this restriction possibility will not normally be used, since the movement of the pedal and the clutch will preferably be restricted in another way, e.g. by means of a stopper which is attached to the body against which the pedal abuts.

Furthermore the valve body's piston section 54 can be omitted. The valve body will then be moved to the closed position due to the differential pressure over this as a result of the drop in pressure which is caused by the fluid flowing through the opening 56. However, this is less advantageous because the shape of this opening will be decisive for the extent of the pressure difference, which will, e.g., require an extremely accurate setting of the axial distance between the valve body and the valve seat during the installation of the valve unit.

We claim:

1. In a device for the prevention of the abuse of a dry-plate clutch for a motor vehicle with a manual gearbox due to too rapid an engagement of the clutch, wherein the device acts jointly with a hydraulic master cylinder and a related slave cylinder for operation of the clutch, and the device includes a valve unit that is installed hydraulically in series with and between the master cylinder and the slave cylinder, the valve unit having a valve body and a valve housing having a valve seat for the valve body and a first and a second valve housing chamber located on each side of the valve seat and arranged to face the slave cylinder and the master cylinder, respectively, the valve unit opening when there is movement of the valve body from the valve seat and into the first valve housing chamber of the valve unit, the improvement comprising a first passage directly connecting the first and second valve chambers of the valve unit with each other to permit restricted fluid flow between the chambers when the valve body sits on the valve seat and the valve unit is closed, means for forcibly opening the valve unit when the clutch is located in a position between a position of maximum disengagement and a second position located close to the position in which the clutch begins to engage, and a spring arranged to exercise a force on the valve body to bias the valve body away from the valve seat, wherein the force exercised by the spring is greater than the force exercised on the valve body by the hydraulic fluid when the fluid flows towards the master cylinder during a predetermined normal rate of engagement of the clutch, but wherein the force exercised by the spring is less than the force exercised by the hydraulic fluid on the valve body when the clutch is engaged more rapidly than at said predetermined rate.

2. The device of claim 1, wherein the valve body has a piston section located on that side of the valve body that faces the slave cylinder, the piston section being arranged to slide in a cylindered section of the first valve housing chamber and having a second passage therein that extends between a side of the piston section that faces the slave cylinder and a side of the piston section that faces the master cylinder.

3. The device of claim 2, wherein the first passage directly connecting the first and second valve housing chambers of the valve unit is located in said piston section.

4. The device of claims 1 or 2, wherein the means for forcibly opening the valve unit comprises a valve rod that is arranged to connect the valve body with a piston of one of the master cylinder or the slave cylinder.

5. The device of claim 4, wherein the diameter of the valve body's piston section is equal to or slightly smaller than the diameter of the piston of the cylinder to which the valve body is arranged to be connected.

6. The device of claim 5, wherein the valve body is arranged to be connected with the piston of the master cylinder.

7. The device of claim 1, wherein the force of the spring that biases the valve body away from the valve seat to open the valve unit is coordinated with the force of a spring device in the clutch that is used to engage the clutch in such a manner that the valve body is moved away from the valve seat by the spring after the clutch has been engaged.

* * * * *